J. H. DENNIS.
Street Car.
No. 2,924,
33,928.
Patented Dec. 17, 1861.
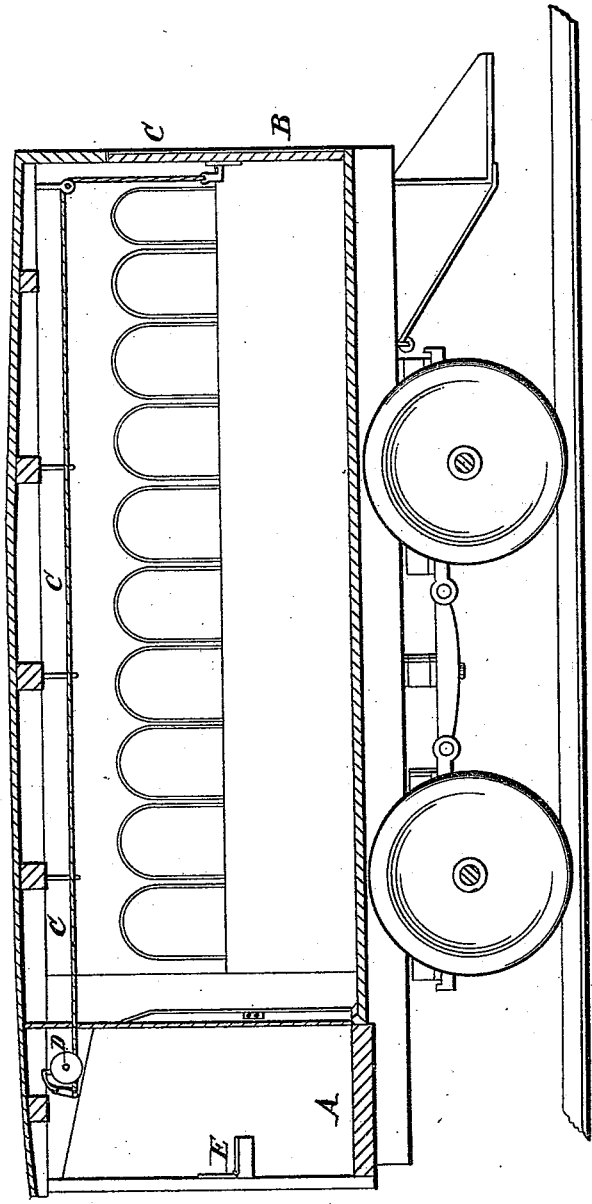
Witnesses:
Charles Hughes
J. W. Coomby
Inventor:
J. H. Dennis
per Munn & Co
Attorneys

UNITED STATES PATENT OFFICE.

JAMES H. DENNIS, OF LOUISVILLE, KENTUCKY.

IMPROVED MODE OF COLLECTING FARES ON STREET-RAILROADS.

Specification forming part of Letters Patent No. 33,928, dated December 17, 1861.

*To all whom it may concern:*

Be it known that I, JAMES H. DENNIS, of Louisville, in the county of Jefferson, State of Kentucky, have invented or produced a new and Improved Mode of Collecting Fares on Street-Railroad Cars; and I do hereby declare that the following is a full, clear, and exact description of the same, reference being had to the accompanying drawing, forming a part of this specification and being a vertical longitudinal section of a car embodying my improvement.

The nature of this invention consists in an improved construction of street-railroad cars, whereby their weight and cumbersomeness are materially reduced and the driver is enabled to act also as conductor, so that the necessity for a collector as independent from the driver is entirely obviated, and yet all the conveniences of the platform for entering the car are preserved, neither the driver nor the passengers being inconvenienced by the arrangement.

In the drawing, A represents the platform of the car, which the driver occupies and by whom the passengers are compelled to pass, there being no other entrance to the car.

B represents platformless rear with door for egress only.

C represents the strap or cord fastened to the rear door, if there be one, passing thence through the interior of the car and connecting with, but detachable from, the bell or gong D in front.

E is a fare-box.

When a passenger enters one of these cars, which he can only do by the platform in front, he passes necessarily by the driver, who collects the fare or sees that the passenger deposits it in the fare-box, if one be used. When a passenger desires to leave the car, he pulls the strap or cord attached to the bell or gong, causing it to ring or strike, when the car is stopped, and if there be a rear door the driver by detaching the strap from the gong permits it to be opened by the passenger who passes out, when by pulling the strap and attaching it to the gong the driver shuts the door, which cannot be opened until the strap is again detached, there being no means provided for opening the door from the outside. If no strap or cord be used, or if it be not attached to the rear door, then the latter must be self-shutting and openable only from within. Whether there be a rear door or not, the passenger may be permitted to pass out as he came in. The car, when a terminus is reached, may be reversed or turned end for end by a turn-table or otherwise.

I am aware that upon omnibuses and other ordinary vehicles the driver usually acts also as collector, either by means of a fare-box or otherwise. I am aware also that cars have been constructed which accomplish the same result, but not without great inconvenience both to the driver and passengers; but I am not aware that a street-railway car has ever before been constructed or suggested which compelled the passenger to enter only in front, thereby enabling the driver to collect without being compelled under any circumstances to stop his car while doing so, and retaining at the same time all the conveniences to the passenger of the platform for entering the car.

In the improvement I have invented and described above the necessity that frequently arises for making change for the passenger to enable him to pay his fare is attended with no inconvenience or delay, as the car may be started as soon as the passenger gets upon the platform and continued even in rapid motion during the whole time that the driver is furnishing the necessary change; nor can the passenger, as is often attempted, elude or avoid paying his fare, as in entering the car he is brought immediately face to face with the driver, who at once collects it or sees that it is deposited. I thus, without objection of any sort whatever, accomplish the saving of the entire cost of a collector, which is usually at least twenty-five per cent. of the entire running expenses of the car.

Having thus described my invention, what I claim as new, and desire to secure by Letters Patent, is—

As an improvement in street-railroad cars, the combination of the platformless rear with a door for exit only, the entrance platform and door in front, the strap C, and fare-box E, all as hereinbefore explained, and for the purposes set forth.

J. H. DENNIS.

Witnesses:
   G. SPRATT,
   WM. J. LEWERS.